United States Patent
Nakayama et al.

(10) Patent No.: US 8,776,373 B2
(45) Date of Patent: Jul. 15, 2014

(54) METHOD FOR PRODUCING A DISC ROLL

(71) Applicant: Nichias Corporation, Tokyo (JP)

(72) Inventors: Masaaki Nakayama, Shizuoka (JP); Daiji Tahara, Shizuoka (JP); Masafumi Igo, Tokyo (JP)

(73) Assignee: Nichias Corporation, Tokyo (JP)

( * ) Notice: Subject to any disclaimer, the term of this patent is extended or adjusted under 35 U.S.C. 154(b) by 0 days.

(21) Appl. No.: 14/146,156

(22) Filed: Jan. 2, 2014

(65) Prior Publication Data

US 2014/0116093 A1    May 1, 2014

Related U.S. Application Data

(62) Division of application No. 10/812,304, filed on Mar. 30, 2004, now Pat. No. 8,636,633.

(30) Foreign Application Priority Data

Mar. 31, 2003  (JP) .................................. 2003-95983
Mar. 31, 2003  (JP) .................................. 2003-96204

(51) Int. Cl.
*B21K 1/02*     (2006.01)
*F16C 13/00*    (2006.01)

(52) U.S. Cl.
USPC ................ 29/895.21; 29/895.213; 29/895.22; 492/40; 492/50

(58) Field of Classification Search
CPC ...... F16C 13/00; D21G 1/0246; B21B 27/00; B21B 27/021; B21B 27/024; B29C 39/003; C03B 17/068; C03B 33/04; C03B 13/16; C03B 35/181; C03B 35/188; C03B 35/189
USPC .................. 29/895, 895.21, 895.213, 895.22, 29/895.3; 492/38, 39, 40, 50, 53
See application file for complete search history.

(56) References Cited

U.S. PATENT DOCUMENTS

| | | | |
|---|---|---|---|
| 4,416,043 A * | 11/1983 | Aoki et al. | 492/59 |
| 4,533,581 A | 8/1985 | Asaumi et al. | |
| 4,533,968 A | 8/1985 | Yoshida et al. | |
| 5,521,133 A | 5/1996 | Koermer et al. | |
| 5,763,345 A | 6/1998 | Ohshima et al. | |
| 6,896,646 B2 * | 5/2005 | Kaiser et al. | 492/40 |
| 2003/0181302 A1 | 9/2003 | Kaiser et al. | |

FOREIGN PATENT DOCUMENTS

| | | |
|---|---|---|
| JP | 56-169169 | 12/1981 |
| JP | 59-28771 | 7/1984 |
| JP | 6-279834 | 10/1994 |
| JP | 6-287025 | 10/1994 |

* cited by examiner

*Primary Examiner* — Sarang Afzali
(74) *Attorney, Agent, or Firm* — Nixon & Vanderhye P.C.

(57) ABSTRACT

A disc roll includes a plurality of annular disc members each defining a hole and having a peripheral surface; and a rotary shaft fitted into the holes of the annular disc members by insertion, whereby the peripheral surfaces of the disc members serve as a conveying surface of the disc roll. The disc members include an inorganic fiber, mica and a clay having a content of particle components that have a particle size of 5 µm or larger of not higher than 30% by weight based on the weight of the clay.

12 Claims, 2 Drawing Sheets

METHOD FOR PRODUCING A DISC ROLL

CROSS-REFERENCES TO RELATED APPLICATIONS

This application is a divisional of U.S. patent application Ser. No. 10/812,304, filed Mar. 30, 2004, pending, which claims priority of Japanese Patent Application No. 2003-95983 filed Mar. 31, 2003 and Japanese Patent Application No. 2003-96204 filed Mar. 31, 2003, the entire contents of each of which are hereby incorporated by reference in this application.

STATEMENT REGARDING FEDERALLY SPONSORED RESEARCH OR DEVELOPMENT (NOT APPLICABLE)

FIELD OF THE INVENTION

The present invention relates to a disc roll comprising a plurality of annular disc members fitted together on a rotary shaft by insertion to form a conveying surface by peripheral surfaces of the above-mentioned disc members, and particularly to a disc roll suitable for the production of high-grade plate glass. Further, the invention also relates to a method for producing the above-mentioned disc roll and to a disc member base material for the disc roll.

BACKGROUND OF THE INVENTION

In the production of plate glass, a conveying mechanism for forming the plate glass from a molten state or for slowly cooling the formed glass plate is required. In general, the conveying mechanism is constituted by a conveying roll, and a disc roll has been used as one example of the conveying roll.

FIG. 1 is a schematic view showing one example of a disc roll 10, which is prepared by stamping out annular discs from a disc member base material which is obtained by forming, into a plate form having a thickness of several millimeters, an aqueous slurry in which an inorganic fiber, an inorganic filler, a binder, etc. are compounded; fitting these plurality of disc members 12 together on a metal shaft 11 acting as a rotary shaft by insertion to form a roll-shaped laminate; and fixing the laminate on the shaft with nuts 15 or the like with the interposition of flanges 13 arranged at both ends, with some compression applied to the disc members 12. The peripheral surfaces of the disc members 12 function as a conveying surface.

Then, the above-mentioned disc roll 10 is integrated, for example, into a plate glass production apparatus 100 as shown in FIG. 2, and used for molding and conveyance of plate glass. This plate glass production apparatus 100 is an apparatus for producing plate glass by continuously discharging a glass melt 110 from a linearly opened slit 102 of a melting furnace 101, allowing this discharged strip-shaped glass melt 110 to flow downward and to be cooled during the fall to harden it. The disc rolls 10 function as a pair of stretching rolls, which hold the strip-shaped glass melt 110 therebetween to forcibly send it downwards. It is therefore preferred that the disc roll 10 has, as well as heat resistance, some degree of flexibility so as not to damage a glass surface. A disc roll containing mica particles has been known (see Patent Document 1).

Patent Document 1: JP 59-028771 B

As shown in FIG. 2, a pair of the disc rolls 10 hold the strip-shaped glass melt 110 therebetween to forcibly send it downwards. However, the strip-shaped glass melt 110 is in a semisolid state, so that both ends of a conveying face tend to be conglobated by surface tension. Accordingly, the resulting plate glass is hardened with its center portion being thin, resulting in deteriorated flatness at both ends thereof. Further, only both ends of the disc roll 10 come into contact with the plate glass upon conveyance, and the plate glass breaks in some cases by stress concentration to the thick ends thereof.

Further, the disc roll 10 is constantly in contact with the high-temperature strip-shaped glass melt 110. By pressing both ends thereof in a high-temperature state for ensuring the surface pressure with the glass plate, thermal deformation of the shaft 11 occurs. As a result, the conveying surface also has an uneven surface following the shape of the shaft 11, so that contacts with the strip-shaped glass melt 110 take place only locally, thereby causing stress concentration to a part of the plate glass to break the glass plate or to scratch the surface thereof.

There is a tendency that the area of the plate glass to be produced is being increased. With that tendency, the conveying surface of the disc roll 10 increases in width, and the shaft increases in length. Accordingly, the influence by surface tension and the degree of deformation of the shaft 11 as described above also increase, and it has increasingly become difficult to uniformly apply force to the plate glass.

Such problems have not been solved by conventional disc rolls including the disc roll described in patent document 1, having flexibility imparted thereto.

Further, disc rolls become liable to wear out as flexibility is imparted thereto, resulting in a shortened life thereof. Further, in liquid crystal displays and plasma displays, quality requirements to plate glass are particularly severe, and it becomes a significant problem to prevent contamination of the surface thereof caused by abrasion powder (powder omission) from the disc roll. The disc roll in which importance is attached to flexibility is liable to wear out, so that the powder omission is liable to occur, which tends to result in a reduced yield.

In order to impart flexibility to the disc roll, it is also possible to reduce the pressure applied at the time when the disc members 12 are loaded on the shaft 11 and compressed from both ends, to thereby lower the compressed density. However, such reduced pressure adversely affects the durability of the roll, resulting in a shortened roll life.

SUMMARY OF THE INVENTION

The invention has been made in view of the foregoing problems in the conventional techniques.

Accordingly, a first object of the invention is to provide a disc roll which can uniformly apply force to plate glass.

A second object thereof is to provide a disc roll excellent in heat resistance and durability, and having moderate flexibility and a long life, in spite of its low compressed density.

Another object of the present invention is to provide a disc member base material for obtaining the above-mentioned disc rolls.

A still other object of the present invention is to provide a method for producing the disc roll using the above-mentioned disc member base material.

Other objects and effects of the invention will become apparent from the following description.

The above-mentioned first objects have been achieved by providing the following disc rolls, methods for producing a disc roll and disc member base materials (This aspect of the present invention is hereinafter referred to as "First Invention").

(1A) A disc roll comprising:
a plurality of annular disc members each defining a hole and having a peripheral surface; and
a rotary shaft fitted into the holes of said annular disc members by insertion, whereby the peripheral surfaces of said disc members serve as a conveying surface of the disc roll,
wherein said disc members have a compression deformation rate of 0.05 to 0.3 mm under a load of 10 kgf/cm.

(2A) The disc roll according to item (1A) above, wherein said disc members contain an inorganic fiber in an amount of 20 to 40% by weight based on the total weight of said disc members and have voids of 30 to 70% by volume.

(3A) The disc roll according to item (1A) or (2A) above, wherein said disc members contain mica in an amount of 20 to 50% by weight based on the total weight of said disc members.

(4A) A method for producing a disc roll, comprising the steps of:
forming into a plate form a slurry raw material containing an inorganic fiber in an amount of 20 to 40% by weight to obtain a disc member base material;
stamping out a plurality of annular disc members each defining a hole and having a peripheral surface, from said disc member base material; and
fitting said plurality of annular disc members on a rotary shaft by insertion through the holes and fixing said disc members thereon to obtain a disc roll.

(5A) The method according to item (4A) above, wherein said formation of the disc member base material is conducted by a paper-making process.

(6A) The method according to item (4A) or (5A) above, wherein said slurry raw material contains in an amount of 3 to 15% by weight a material which is burnt off by heat applied at the time of burning or upon use.

(7A) A plate-shaped disc member base material, having a compression deformation rate of 0.05 to 0.3 mm under a load of 10 kgf/cm.

(8A) The disc member base material according to item (7A) above, containing an inorganic fiber in an amount of 20 to 40% by weight based on the weight of said disc member base material and have voids of 30 to 70% by volume.

(9A) The disc member base material according to item (7A) or (8A) above, containing mica in an amount of 20 to 50% by weight based on the weight of said disc member base material.

In the disc roll of the first invention, the disc member has the above-mentioned specific compression deformation rate, and therefore deforms to a moderate degree by contact with glass melt or plate glass, which causes the conveying surface to contact with the glass melt or the plate glass over the whole surface, resulting in the plate glass having excellent flatness and no breakage in conveyance.

The above-mentioned second objects have been achieved by providing the following disc rolls, methods for producing a disc roll and disc member base materials (This aspect of the present invention is hereinafter referred to as "Second Invention").

(1B) A disc roll comprising:
a plurality of annular disc members each defining a hole and having a peripheral surface; and
a rotary shaft fitted into the holes of said annular disc members by insertion, whereby the peripheral surfaces of said disc members serve as a conveying surface of the disc roll,
wherein said disc members comprise an inorganic fiber, mica and a clay having a content of particle components that have a particle size of 5 μm or larger of not higher than 30% by weight based on the weight of the clay.

(2B) The disc roll according to item (1B) above, wherein said mica is muscovite.

(3B) The disc roll according to item (1B) or (2B) above, wherein said inorganic fiber is present in an amount of 5 to 40% by weight based on the total weight of said disc members, and said clay is present in an amount of 5 to 55% by weight based on the total weight of said disc members.

(4B) The disc roll according to any one of items (1B) to (3B) above, wherein said mica is present in an amount of 5 to 60% by weight based on the total weight of the disc member.

(5B) A method for producing a disc roll, comprising the steps of:
forming into a plate form a slurry raw material to obtain a disc member base material, said slurry raw material comprising an inorganic fiber, mica and a clay containing particle components that have a particle size of 5 μm or larger in an amount of 30% by weight or less based on the weight of the clay;
stamping out a plurality of annular disc members each defining a hole and having a peripheral surface, from said disc member base material; and
fitting said plurality of annular disc members on a rotary shaft by insertion through the holes and fixing said disc members thereon to obtain a disc roll.

(6B) The method according to item (5B) above, wherein said formation of the disc member base material is conducted by a paper-making process.

(7B) A plate-shaped disc member base material comprising an inorganic fiber, mica and a clay having a content of particle components that have a particle size of 5 μm or larger of not higher than 30% by weight based on the weight of the clay.

(8B) The disc member base material according to item (7B) above, wherein said mica is muscovite.

(9B) The disc member base material according to item (7B) or (8B) above, wherein said inorganic fiber is present in an amount of 5 to 40% by weight based on the weight of said disc member base material, and said clay is present in an amount of 5 to 55% by weight based on the weight of said disc member base material.

(10B) The disc member base material according to any one of items (7B) to (9B) above, wherein said mica is present in an amount of 5 to 60% by weight based on the weight of the disc member base material.

The disc roll of the second invention is excellent in flexibility and wear resistance, and particularly suitable for the production of high-grade plate glass having a large area, in spite of its low compressed density, because fine and uniformly sized clay particles contained into the disc material exhibits a stronger binding function to restrain other filling materials more firmly in the disc material.

Figure 1:
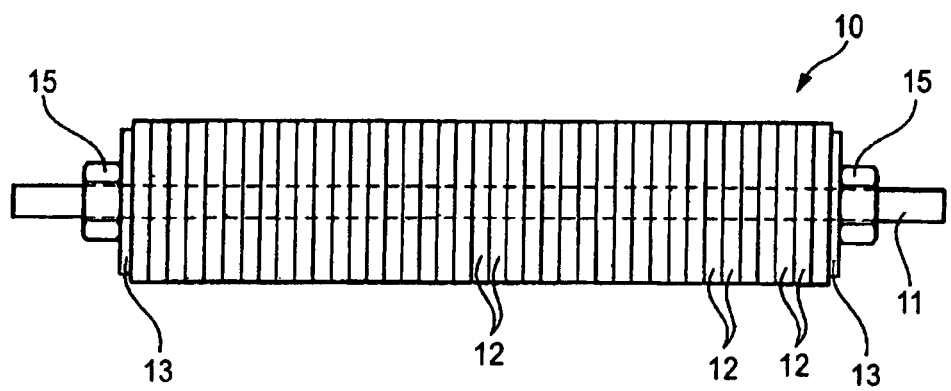
FIG. 1 is a schematic view showing one example of the disc roll of the invention.

The reference numerals used in the drawings represents the followings, respectively.

| | |
|---|---|
| 10: | Disc Roll |
| 11: | Metal Shaft |
| 12: | Disc members |
| 13: | Flanges |
| 15: | Nuts |
| 50: | Stand |
| 60: | Compression Member |
| 100: | Plate Glass Production Apparatus |
| 101: | Melting Furnace |
| 102: | Slit |
| 110: | Strip-Shaped Glass Melt |

DETAILED DESCRIPTION OF THE INVENTION

The invention will be described in detail below.

First Invention

The disc roll of the first invention may have the same structure as that of a conventional disc roll, and, for example, the disc roll 10 shown in FIG. 1 can be cited. In the first invention, the constituent materials thereof are adjusted so that the disc member 12 has a compression deformation rate of 0.05 to 0.3 mm, preferably 0.08 to 0.2 mm, more preferably 0.1 to 0.15 mm, under a load of 10 kgf/cm. When the compression deformation rate is less than 0.05 mm, the disc member 12 is too hard to cause deformation by contact with the glass melt or the glass plate. On the other hand, when the compression deformation rate exceeds 0.3 mm, the disc member 12 is too soft, resulting in poor wear resistance to bring about so-called powder omission.

The constituent materials of the disc member 12 preferably comprise the inorganic fiber. The inorganic fiber contributes to compression deformation of the disc member 12 owing to bending of itself. There is no limitation on the kind of inorganic fiber overwhelmingly excellent in flexibility compared to particle materials, and a variety of inorganic fibers which have hitherto been used for disc rolls can be appropriately used. Examples thereof include ceramic fiber, mullite fiber, alumina fiber, silica fiber, silica.alumina fiber, glass fiber and rock wool fiber. The alumina fiber, mullite fiber, silica.alumina fiber and silica fiber are suitable among others because of their excellent heat resistance. It is preferred that these inorganic fibers have an average fiber diameter of 0.5 to 10 μm, and an average fiber length of 1 mm or more, from the viewpoint of flexibility. Further, the inorganic fibers can be used as a combination of two or more thereof as needed.

The content of the inorganic fiber is preferably from 20 to 40% by weight, and particularly preferably from 25 to 35% by weight. When the content of the inorganic fiber is less than 20% by weight, the bending action of the inorganic fiber itself may become insufficient, resulting in failure to realize the above-mentioned lower limit of the compression deformation rate. On the other hand, when the content of the inorganic fiber exceeds 40% by weight, the bending action of the inorganic fiber itself may excessively increase, resulting in the compression deformation rate exceeding the above-mentioned upper limit.

Further, in order to bind the inorganic fiber, an inorganic binder is preferably added. As the inorganic binder, there can be used a clay, glass frit, amorphous cordierite, colloidal silica, alumina sol, sodium silicate, titania sol, lithium silicate or liquid glass. Among them, a clay is preferred, because it exerts shape-holding property by condensation upon drying and because it is sintered by the heat applied thereto upon use of the disc roll to give a hardening action. Therefore, the balance between the improvement in wear resistance of the disc member 12 and its hardness can be attained. Further, the clay includes kibushi clay, potter's clay and fire clay, and kibushi clay is preferred of these because of its high binder effect and small impurity content. Many of the impurities contained in clay are hard substances, so that there is a fear of scratching the plate glass during conveyance.

Further, mica is preferably added. In the disc roll, the shaft 11 on which the disc members 12 are fitted together by insertion is made of metal as shown in FIG. 1. Accordingly, when the shaft 11 is exposed to high temperatures, it thermally expands to elongate along its axial direction. At this time, the disc members 12 cannot follow the elongation of the shaft 11, because the disc members 12 have a lower coefficient of thermal expansion as compared to the metal. As a result, the disc members 12 are separated from one another. On the other hand, the mica has an extremely thin layered structure, and releases crystal water upon heating to cause crystal transformation. In that case, the mica tends to expand in its layer direction. This expansion of the mica in its layer direction enhances the followabilty of the disc members 12 to the thermal expansion of the shaft 11. In order to obtain such an effect, the mica content is preferably from 20 to 50% by weight, and more preferably from 25 to 45% by weight, based on the total weight of the disc member.

As the mica, there can be used muscovite ($K_2Al_4(Si_3Al)_2O_{20}(OH)_4$), black mica, phlogopite ($K_2Mg_6(SiAl)_2O_{20}(OH)_4$), paragonite, lepidonite or fluorine synthetic mica. With consideration of the above-mentioned followability, muscovite is preferred because it releases crystal water at about 600° C. which is lower than the surface temperature of molten glass.

The average particle size of the mica is from 5 to 500 μm, preferably from 100 to 300 μm, and more preferably from 200 to 300 μm. When the average particle size is within the above-mentioned range, the mica effectively functions as a plate spring for retaining the stress, applied upon compression loading, between the mica and other constituent materials, particularly the inorganic fiber, thereby enabling to further enhance the followability to the thermal expansion of the shaft 11 and improving recovery property after compression deformation.

As described below, the disc member base material is obtained by forming a slurry raw material containing the inorganic fiber etc., and burning it. When a material which is burnt off at the time of burning, such as an organic material which is burnt off at a temperature of 350 to 500° C. or an inorganic material which is burnt off at a temperature of 450 to 600° C., is incorporated into the slurry raw material, voids derived from such a material are formed in the disc member 12, which makes it possible to cause compression deformation more effectively. The organic materials which are burnt off at 350 to 500° C. include natural fibers such as softwood pulp, organic fibers such as petrochemical synthetic fibers (e.g., a PET fiber and an acrylic fiber), starch, synthetic resin binders such as NBR emulsion, SBR emulsion, acrylic emulsion and vinyl acetate-based emulsion, and organic particles such as polyethylene and polypropylene. The inorganic materials which are burnt off at 450 to 600° C. include crystalline carbon and amorphous carbon, both of which can be used in either particle form or fiber form. The percentage of voids in the disc member 12 is preferably from 30 to 70% by volume, and more preferably from 50 to 65% by volume, and the percentage of voids within the above-described ranges can be attained by adjusting the amount of the organic fiber, the organic binder or the like contained in the slurry raw material.

Then, the method for producing the disc roll of the first invention will be described. The production method is basically conducted in accordance with a conventional method, and described below with reference to FIG. 1 again. First, an aqueous slurry containing the above-mentioned inorganic fiber, the inorganic binder such as the clay, the mica, the organic fiber, the organic binder, etc. is formed into a plate form, and dried and burnt to obtain a disc member base material. At this time, the use of the paper-making process is efficient and preferred. That is, the aqueous slurry is formed into a plate form with a paper-making machine, and dried and burnt. The thickness of the disc member base material can be appropriately set. The thickness may be similar to that of conventional one, and is generally from 2 to 10 mm.

Then, annular disc members 12 are stamped out from the disc member base material, and these plurality of disc members 12 are fitted together on a rotary shaft 11 made of metal (for example, made of iron) by insertion to form a roll-shaped laminate. Then, they are fixed with nuts 15 or the like with the interposition of flanges 13 arranged at both ends, with some compression applied from both ends to the disc members 12. Then, peripheral surfaces of the disc members 12 are ground so as to give a predetermined roll diameter, thereby obtaining a disc roll 10.

Second Invention

The disc roll of the second invention may have the same structure as that of a conventional disc roll, and, for example, the disc roll 10 shown in FIG. 1 can be cited. In the second invention, the disc member 12 contains an inorganic fiber, mica and a clay having a content of particle components that have a particle size of 5 μm or larger of not higher than 30% by weight based on the total weight of the clay.

As for the kind of clay, the clays include kibushi clay, potter's clay and fire clay. Among them, kibushi clay is preferred because of its high binder effect and small impurity content. The clays can be used either alone or as a combination of two or more thereof as needed. In the second invention, the incorporation of the clay can improve the wear resistance of the disc member 12 owing to the hardening action caused by drying and heating.

The clay is purified by separation, thereby adjusting the content of the particle components having a particle size of 5 μm or larger to not higher than 30% by weight, preferably not higher than 15% by weight and more preferably not higher than 10% by weight. As for the lower limit, it is most suitable to contain no particle components having a particle size of 5 μm or larger at all. Such fine and uniformly sized clay particles exhibit higher binding ability to restrain other constituting materials firmly.

By this separation purification, impurities are also removed at the same time. In general, the clay which is a natural mineral can be controlled in particle size to some degree by pulverization sizing. However, the clay contains impurities in large amounts, and the impurities contained therein include, in many cases, those having no sinterability such as silica. In the disc roll 10 upon use, sintering occurs by contact with a high-temperature conveying product such as molten glass, thereby allowing hardening to proceed. However, the impurities having no sinterability become a factor of inhibiting the hardening action of the disc member 12 at this time. Moreover, many of the impurities are hard substances, so that there is a fear of scratching the plate glass particularly during conveyance. The content of impurities is preferably close to zero without limit. However, considering the actual situations of labor, cost, etc., the content of impurities is preferably 10% by weight or less, more preferably 5% by weight or less, and still more preferably 1% by weight or less based on the weight of the clay.

In order to reduce the content of coarse particles to the specific value or less as described above, and further to remove the impurities, wet sizing is effective as the separation purification process. By conducting the wet sizing, impurities different in specific gravity and size are removed. Furthermore, since the sedimentation velocity varies depending on particle size, raw clay having a finer particle size and a sharper particle size distribution can be generally obtained by the wet sizing than by dry sizing.

As the inorganic fibers, there can be appropriately used a variety of inorganic fibers which have hitherto been used for disc rolls. Examples thereof include ceramic fiber, mullite fiber, alumina fiber, silica fiber, silica.alumina fiber, glass fiber and rock wool fiber. Of these, those having excellent heat resistance which include alumina fiber, mullite fiber, silica.alumina fiber and silica fiber are suitable. Further, the inorganic fibers can be used as a combination of two or more thereof as needed.

Mica is known to be excellent in high elasticity, slidability, wear resistance and heat resistance, and has long been industrially utilized in various fields. However, in the second invention, mica is added in order to allow the disc member 12 to follow the thermal expansion of the shaft 11. In the disc roll, the shaft 11 on which the disc members 12 are fitted together by insertion is made of metal as shown in FIG. 1. Accordingly, when the shaft 11 is exposed to high temperatures, it thermally expands to elongate along its axial direction. At this time, the disc members 12 cannot follow the elongation of the shaft 11, because the disc members 12 has a lower coefficient of thermal expansion as compared to the metal. As a result, the disc members 12 are separated from one another. On the other hand, mica has an extremely thin layered structure, and releases crystal water upon heating to cause crystal transformation. In that case, mica tends to expand in its layer direction. This expansion of mica in its layer direction enhances the followabilty of the disc members 12 to the thermal expansion of the shaft 11.

As the mica, there can be used muscovite ($K_2Al_4(Si_3Al)_2O_{20}(OH)_4$), black mica, phlogopite ($K_2Mg_6(SiAl)_2O_{20}(OH)_4$), paragonite, lepidonite or fluorine synthetic mica. With consideration of the above-mentioned followability, muscovite is preferred because it releases crystal water at about 600° C. which is lower than the surface temperature of molten glass.

The average particle size of the mica is from 5 to 500 μm, preferably from 100 to 300 μm, and more preferably from 200 to 300 μm. When the average particle size is within the above-mentioned range, the mica effectively functions as a plate spring for retaining the stress, applied upon compression loading, between the mica and other constituent materials, particularly the inorganic fiber, thereby enabling to further enhance the followability to the thermal expansion of the shaft 11 and improving recovery property after compression deformation.

As for the blending of the above-mentioned inorganic fiber, clay and mica, the inorganic fiber is added preferably in an amount of 5 to 40% by weight, more preferably in an amount of 5 to 30% by weight, based on the total weight of the disc member, the clay is added preferably in an amount of 5 to 55% by weight, more preferably in an amount of 20 to 40% by weight, based on the total weight of the disc member, and the mica is added preferably in an amount of 5 to 60% by weight, more preferably in an amount of 20 to 55% by weight, based on the total weight of the disc member. The disc roll having a good balance between flexibility and wear resistance can be obtained within these ranges.

Then, the method for producing the disc roll of the second invention will be described. The production method is basically conducted in accordance with a conventional method, and described below with reference to FIG. 1 again. First, an aqueous slurry containing the above-mentioned inorganic fiber, clay and mica is formed into a plate form, and dried. At this time, the use of the paper-making process is efficient and preferred. That is, the aqueous slurry containing the inorganic fiber, the clay and the mica, and optionally a coagulant aid, an organic fiber, an organic binder, etc. as needed, in predetermined amounts, and this aqueous slurry is formed into a plate form with a paper-making machine and dried. Thereby, a disc member base material can be obtained. The thickness of disc member base material can be appropriately set. The thickness may be similar to that of conventional one and is generally from 2 to 10 mm.

Then, annular disc members 12 are stamped out from the disc member base material, and these plurality of disc members 12 are fitted together on a rotary shaft 11 made of metal (for example, made of iron) by insertion to form a roll-shaped laminate. Then, they are fixed with nuts 15 or the like with the interposition of flanges 13 arranged at both ends, with some compression applied from both ends to the disc members 12. Then, the peripheral surfaces of the disc members 12 are ground so as to give a predetermined roll diameter, thereby obtaining the disc roll 10.

EXAMPLES

The invention will be further described below with reference to examples and a comparative example, but the invention should not be construed as being limited thereby.

Examples 1A to 9A and Comparative Examples 1A to 2A

An aqueous slurry in which the raw materials shown in Table 1A were compounded was prepared, and then subjected to a paper-making process using a cylinder type paper-making machine to obtain a plate-shaped formed product having a size that gives a dimension after drying of 100 mm×100 mm×6 mm. The plate-shaped formed product was then dried at a temperature of from 90 to 120° C. for 6 hours to obtain a disc member base material. Herein, the raw materials used were specifically as shown below.

Aluminosilicate Fiber:
　Fineflex bulk fiber manufactured by Nichias Corporation
Muscovite:
　Kralite manufactured by Kuraray Co., Ltd.
Kibushi Clay:
　Kibushi clay manufactured by Shinmei Industry Co., Ltd.
Organic Fiber (pulp):
　Hinton pulp manufactured by Hinton
Organic Binder (starch):
　Excell manufactured by Nippon Starch Chemical Co., Ltd.
Organic Particles (polyethylene):
　Flo-thene manufactured by Sumitomo Seika Chemicals Co., Ltd.
Carbon Fiber:
　Besfight chopped fiber manufactured by Toho Tenax Co., Ltd.

From the disc member base material thus obtained, disc members each having an outer diameter of 80 mm and an internal diameter of 30 mm were stamped out, and fitted together on an iron shaft having a diameter of 30 mm and a length of 100 mm by insertion to prepare a column-shaped disc roll as shown in FIG. 1. Incidentally, the disc members were compressed from the both ends thereof through flanges 13 so as to give a compressed density of 1.2 g/cm$^3$ and then fixed. The thus obtained disc roll was then subjected to the following measurements and evaluations.

Measurement of Percentage of Voids

The percentage of voids was determined from the compressed density of the disc roll and the true densities of the raw materials in accordance with the following equation.

Percentage of voids of roll=1−[(Compressed density of roll)/(Weighted average true density of raw materials)]

Measurement of Compression Deformation Rate

Figure 3:
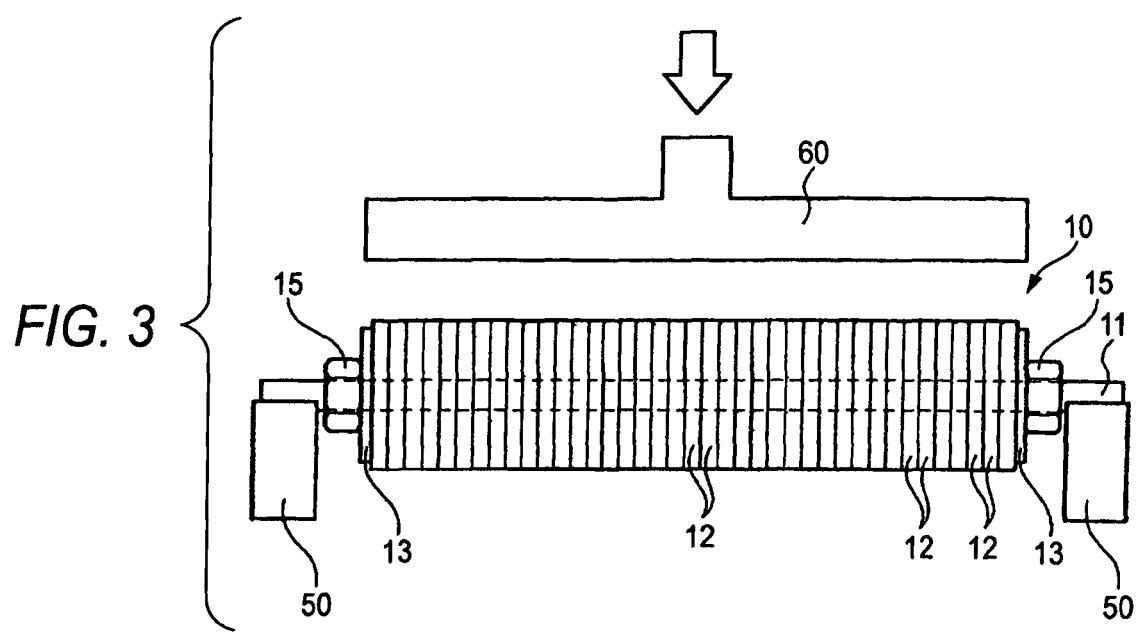
FIG. 3 is a schematic view showing an apparatus used for the measurement of the compression deformation rate in Examples.

The resulting disc roll was supported by a stand 50 at both ends of the shaft 11, and a load of 10 kgf/cm was applied through a compression member 60 at a rate of 1 mm/min to a conveying surface constituted by the disc members 12, as shown in FIG. 3. The compression deformation rate under this state was measured. The results thereof are shown in Table 1A.

Confirmation of Scratches on Glass Surface

Figure 2:
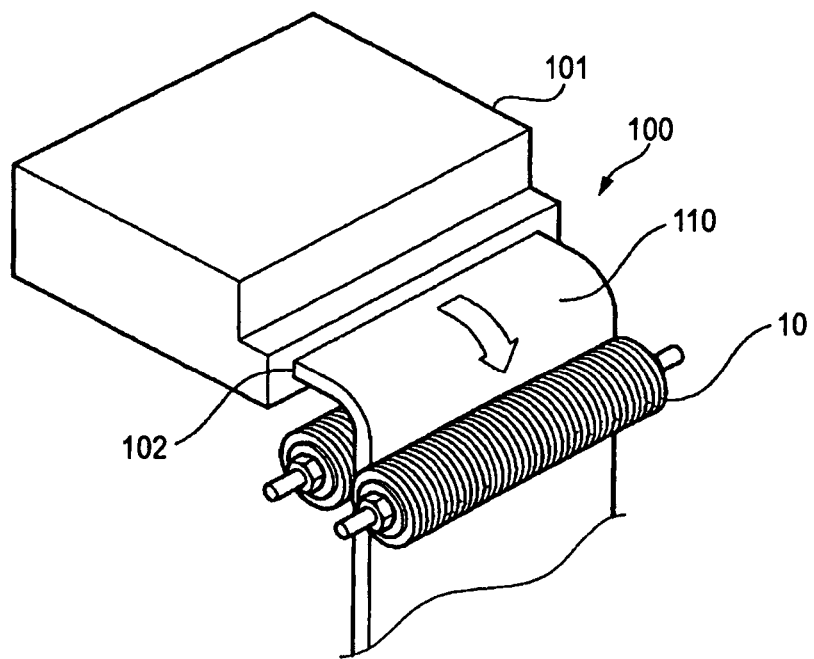
FIG. 2 is a schematic view showing one example of the way of using the disc roll shown in FIG. 1 (a plate glass production apparatus).

Separately, a disc roll of the same type was prepared using each disc member base material, and integrated into a plate glass production apparatus as shown in FIG. 2 to try to prepare plate glass. Then, the surface of the resulting plate glass was visually observed to confirm the presence or absence of scratches. The results thereof are shown in Table 1A.

TABLE 1A

|  |  | Ex. 1A | Ex. 2A | Ex. 3A | Ex. 4A | Ex. 5A | Ex. 6A | Ex. 7A | Ex. 8A | Ex. 9A | Com. Ex. 1A | Com. Ex. 2A |
|---|---|---|---|---|---|---|---|---|---|---|---|---|
| Inorganic Fiber | Aluminosilicate Fiber | 20 | 30 | 30 | 30 | 30 | 30 | 30 | 30 | 40 | 5 | 50 |
| Mica | Muscovite | 40 | 30 | 30 | 30 | 30 | 30 | 30 | 30 | 20 | 55 | 10 |
| Filler | Kibushi Clay | 25 | 25 | 25 | 25 | 25 | 25 | 20 | 20 | 25 | 25 | 25 |
| Material to Be Burnt Off by Burning | Organic Fiber (Pulp) | 10 |  |  |  |  |  | 15 | 15 | 10 | 10 | 10 |
|  | Organic Binder (Starch) | 5 | 5 | 5 | 5 | 5 |  | 5 | 5 | 5 | 5 | 5 |
|  | Organic Particles (Polyethylene) |  | 10 | 10 |  |  |  |  |  |  |  |  |
|  | Carbon Fiber |  |  |  | 10 | 10 |  |  |  |  |  |  |
| Compression Deformation Rate | (mm) | 0.10 | 0.12 | 0.14 | 0.12 | 0.10 | 0.13 | 0.16 | 0.18 | 0.18 | 0.03 | 0.35 |

TABLE 1A-continued

|  |  | Ex. 1A | Ex. 2A | Ex. 3A | Ex. 4A | Ex. 5A | Ex. 6A | Ex. 7A | Ex. 8A | Ex. 9A | Com. Ex. 1A | Com. Ex. 2A |
|---|---|---|---|---|---|---|---|---|---|---|---|---|
| Percentage of Voids | (% by volume) | 60 | 60 | 60 | 55 | 50 | 60 | 65 | 65 | 60 | 60 | 60 |
| Glass Scratch | (scratches/m$^2$) | 0 | 0 | 0 | 0 | 0 | 0 | 0 | 0 | 0 | 350 | * |

Note 1)
The compounded amounts are shown by "pats by weight".
Note 2)
* Unmeasurable because of the development of cracks in glass.

The results shown in Table 1A reveal that the use of the disc roll having a compression deformation rate of 0.05 to 0.3 mm according to the first invention provides a high-quality plate glass having no scratch on the surface.

As described above, according to the first invention, there is provided a disc roll excellent in heat resistance and durability, having moderate flexibility and a long life, and particularly suitable for the production of the high-grade plate glass having a large area, in spite of its low compressed density.

Examples 1B to 6B and Comparative Examples 1B to 3B

An aqueous slurry in which the raw materials shown in Table 1B were compounded was prepared, and then subjected to a paper-making process using a cylinder type paper-making machine to obtain a plate-shaped formed product having a size that gives a dimension after drying of 100 mm×100 mm×6 mm. The plate-shaped formed product was then dried at a temperature of from 90 to 120° C. for 6 hours to obtain a disc member base material. Herein, the raw materials used were specifically as shown below.

Aluminosilicate Fiber:
   Fineflex bulk fiber manufactured by Nichias Corporation
Muscovite:
   Kralite manufactured by Kuraray Co., Ltd.
Phlogopite:
   Suzolite manufactured by Kuraray Co., Ltd.
Kibushi Clay:
   Kibushi clay manufactured by Shinmei Industry Co., Ltd.
Organic Fiber (pulp):
   Hinton pulp manufactured by Hinton
Organic Binder (starch):
   Excell manufactured by Nippon Starch Chemical Co., Ltd.

From the disc member base material thus obtained, disc members each having an outer diameter of 80 mm and an internal diameter of 30 mm were stamped out, and fitted together on an iron shaft having a diameter of 30 mm and a length of 100 mm by insertion to prepare a column-shaped disc roll as shown in FIG. 1. Incidentally, the disc members were compressed from the both ends thereof through flanges 13 so as to give a compressed density of 1.2 g/cm$^3$ and then fixed. The thus obtained disc roll was then subjected to the following measurements and evaluations.

Measurement of Surface Hardness

The surface hardness (Shore D) of the disc roll was measured in accordance with ASTM D 2240 using analog hardness testing machine D-model manufactured by High Polymer Chemistry Co., Ltd. The results thereof are shown in Table 1B.

Evaluation of Wear Resistance

The disc roll was kept for 180 minutes in a heating furnace maintained at 900° C., and then allowed to cool to room temperature, followed by rubbing with hand. The wear resistance was evaluated by touch at that time. The evaluation criteria are as follows:

Good: A powder is transferred to hand by rubbing.

Excellent: Neither transfer nor powder omission is observed.

The results thereof are shown in Table 1B.

Evaluation of Followability to Shaft

Further, on a roll surface after the above-mentioned evaluation of wear resistance, the total width of clearances between disc members was measured to evaluate followability. The evaluation criteria are as follows:

Excellent: The total width is 0 mm.

Good: The total width is not larger than 1 mm.

Fair: The total width exceeds 1 mm but is not larger than 2 mm.

Poor: The total width exceeds 2 mm.

The results thereof are shown in Table 1B.

Confirmation of Scratches on Glass Surface

Separately, a disc roll of the same type was prepared using each disc member base material, and integrated into a plate glass production apparatus as shown in FIG. 2 to try to prepare plate glass. Then, the surface of the resulting plate glass was visually observed to confirm the presence or absence of scratches. The results thereof are shown in Table 1B.

TABLE 1B

|  |  |  | Ex. 1B | Ex. 2B | Ex. 3B | Ex. 4B | Ex. 5B | Ex. 6B | Com. Ex. 1B | Com. Ex. 2B | Com. Ex. 3B |
|---|---|---|---|---|---|---|---|---|---|---|---|
| Inorganic Fiber | Aluminosilicate | | 20 | 30 | 30 | 30 | 20 | 10 | 30 | 30 | 20 |
| Mica | Muscovite | |  | | 45 | 35 | 25 | 25 | 25 | | 25 | 25 |
|  | Phlogopite | | 55 | | | | | | 25 | | |
| Clay | Kibushi | Elutriated (Note 2) | | | 20 | 30 | 40 | 50 | | | |
|  | Clay | Elutriated (Note 3) | 10 | 10 | | | | | | | |
|  |  | Not Treated | | | | | | | 30 | 30 | 40 |
| Organic Fiber |  | | 10 | 10 | 10 | 10 | 10 | 10 | 10 | 10 | 10 |
| Organic Binder |  | | 5 | 5 | 5 | 5 | 5 | 5 | 5 | 5 | 5 |
| Surface Hardness (Shore D) |  | | 40 | 40 | 45 | 50 | 55 | 60 | 50 | 50 | 55 |

TABLE 1B-continued

|  | Ex. 1B | Ex. 2B | Ex. 3B | Ex. 4B | Ex. 5B | Ex. 6B | Com. Ex. 1B | Com. Ex. 2B | Com. Ex. 3B |
|---|---|---|---|---|---|---|---|---|---|
| Glass Scratch (scratches/m$^2$) | 0 | 0 | 0 | 0 | 0 | 2 | 120 | 105 | 350 |
| Wear Resistance | Good | Good | Good | Excellent | Excellent | Excellent | Excellent | Excellent | Excellent |
| Followability to Shaft | Good | Excellent | Excellent | Excellent | Excellent | Excellent | Fair | Excellent | Excellent |
| Overall Evaluation | Good | Good | Good | Excellent | Excellent | Good | Poor | Poor | Poor |

Note 1)
The compounded amounts are shown by "pats by weight".
(Note 2)
The content of particles of 5 μm or larger in size is 30% by weight or less.
(Note 3)
The content of particles of 5 μm or larger in size is 15% by weight or less.

The results shown in Table 1B reveals that the disc roll of each Example containing the mica and the clay having a content of particle components of 5 μM or larger of not higher than 30% by weight has practically problem-free heat resistance and wear resistance, does not scratch the glass surface, and has moderate flexibility.

As described above, according to the second invention, there is provided the disc roll excellent in heat resistance and durability, having moderate flexibility and a long life, and particularly suitable for the production of the high-grade plate glass having a large area, in spite of its low compressed density.

While the present invention has been described in detail and with reference to specific embodiments thereof, it will be apparent to one skilled in the art that various changes and modifications can be made therein without departing from the spirit and scope thereof.

The invention claimed is:

1. A method for producing a disc roll, comprising the steps of:
    forming into a plate form a slurry raw material to obtain a disc member base material, said slurry raw material comprising an inorganic fiber, mica and a kibushi clay containing particle components that have a particle size of 5 μm or larger in an amount of 30% by weight or less based on the weight of the kibushi clay;
    stamping out a plurality of annular disc members each defining a hole and having a peripheral surface, from said disc member base material; and
    fitting said plurality of annular disc members on a rotary shaft by insertion through the holes and fixing said disc members thereon to obtain a disc roll, whereby the peripheral surface of said disc members serves as a conveying surface of the disc roll,
    wherein the kibushi clay is either elutriated or subjected to a wet sizing separation purification process, and the kibushi clay is configured to be sintered by heat applied thereto upon use of the disc roll to give a hardening action,
    wherein said kibushi clay has a content of impurities of 10% by weight or less based on the weight of the clay,
    wherein said inorganic fiber is present in an amount of 20 to 40% by weight based on the total weight of said disc members, and said kibushi clay is present in an amount of 20 to 40% by weight based on the total weight of said disc members, and
    wherein said mica is present in an amount of 20 to 35% by weight based on the total weight of the disc member.

2. The method according to claim 1, wherein said formation of the disc member base material is conducted by a paper-making process.

3. The method for producing a disc roll according to claim 1, wherein said mica is muscovite.

4. The method for producing a disc roll according to claim 1, wherein the amount of said kibushi clay is 30 to 40% by weight based on the total weight of said disc members.

5. The method for producing a disc roll according to claim 1, wherein said kibushi clay has a content of particles with a particle size of 5 μm or larger of not higher than 15% by weight based on the weight of the kibushi clay.

6. The method for producing a disc roll according to claim 1, wherein said mica has an average particle size of 5 to 500 μm.

7. A method of making a plate-shaped disc member base material comprising an inorganic fiber, mica and a kibushi clay having a content of particle components that have a particle size of 5 μm or larger of not higher than 30% by weight based on the weight of the kibushi clay, the method comprising:
    either elutriating the kibushi clay or subjecting the kibushi clay to a wet sizing separation purification process,
    forming a disc roll from a plurality of annular disc members formed with the plate-shaped disc member base material,
    configuring the kibushi clay to be sintered by heat applied thereto upon use of the disc roll formed therefrom to give a hardening action, and
    providing said kibushi clay with a content of impurities of 10% by weight or less based on the weight of the clay,
    wherein said inorganic fiber is present in an amount of 20 to 40% by weight based on the total weight of said disc member base material, and said kibushi clay is present in an amount of 20 to 40% by weight based on the total weight of said disc member base material, and wherein said mica is present in an amount of 20 to 35% by weight based on the total weight of the disc member base material.

8. The method according to claim 7, wherein said mica is muscovite.

9. The method according to claim 7, wherein the amount of said kibushi clay is 30 to 40% by weight based on the total weight of said disc member base material.

10. The method according to claim 7, wherein said kibushi clay has a content of particles with a particle size of 5 μm or larger of not higher than 15% by weight based on the weight of the kibushi clay.

11. The method according to claim 7, wherein said mica has an average particle size of 5 to 500 μm.

12. A method for producing a glass using a disc roll as a conveying roll,
    wherein the disc roll comprises a plurality of annular disc members each defining a hole and having a peripheral surface and a rotary shaft fitted into the holes of said annular disc members by insertion, whereby the peripheral surface of said disc members serves as a conveying surface of the disc roll,
wherein said disc members comprises an inorganic fiber, mica and a kibushi clay containing particle components that have a particle size of 5 μm or larger in an amount of 30% by weight or less based on the weight of the kibushi clay,
wherein the kibushi clay being either elutriated or subjected to a wet sizing separation purification process, and the kibushi clay being configured to be sintered by heat applied thereto upon use of the disc roll to give a hardening action,
wherein said kibushi clay has a content of impurities of 10% by weight or less based on the weight of the clay,
wherein said inorganic fiber is present in an amount of 20 to 40% by weight based on the total weight of said disc members, and said kibushi clay is present in an amount of 20 to 40% by weight based on the total weight of said disc members, and
wherein said mica is present in an amount of 20 to 35% by weight based on the total weight of the disc members.

\* \* \* \* \*